(12) United States Patent
Tsutano et al.

(10) Patent No.: US 12,679,749 B2
(45) Date of Patent: Jul. 14, 2026

(54) ULTRAPURE WATER PRODUCTION SYSTEM

(71) Applicant: ORGANO CORPORATION, Tokyo (JP)

(72) Inventors: Kyohei Tsutano, Tokyo (JP); Fumitaka Ichihara, Tokyo (JP); Fumio Sudo, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 378 days.

(21) Appl. No.: 18/284,353

(22) PCT Filed: Feb. 4, 2022

(86) PCT No.: PCT/JP2022/004467
§ 371 (c)(1),
(2) Date: Sep. 27, 2023

(87) PCT Pub. No.: WO2022/209285
PCT Pub. Date: Oct. 6, 2022

(65) Prior Publication Data
US 2024/0158267 A1 May 16, 2024

(30) Foreign Application Priority Data
Mar. 30, 2021 (JP) ................................. 2021-057622

(51) Int. Cl.
*C02F 1/42* (2023.01)
*B01D 61/14* (2006.01)
(Continued)

(52) U.S. Cl.
CPC .............. *C02F 1/42* (2013.01); *B01D 61/145* (2013.01); *B01D 61/463* (2022.08); *B01D 61/58* (2013.01);
(Continued)

(58) Field of Classification Search
CPC .... C02F 1/42; C02F 1/32; C02F 1/444; C02F 9/00; C02F 1/44; C02F 2001/422;
(Continued)

(56) References Cited

U.S. PATENT DOCUMENTS

| | | | |
|---|---|---|---|
| 2016/0059273 A1 | 3/2016 | Yano et al. | |
| 2020/0024155 A1* | 1/2020 | Kano ...................... | C02F 1/283 |
| 2021/0246050 A1 | 8/2021 | Tsutano et al. | |

FOREIGN PATENT DOCUMENTS

| | | | |
|---|---|---|---|
| CN | 110248899 A | * 9/2019 | ........... B01D 61/145 |
| CN | 111902368 | 11/2020 | |

(Continued)

OTHER PUBLICATIONS

Machine-generated English translation of JP 2016197048, generated on Dec. 4, 2025.*

(Continued)

*Primary Examiner* — Fred Prince
(74) *Attorney, Agent, or Firm* — Greenblum & Bernstein, P.L.C.

(57) ABSTRACT

An ultrapure water production system capable of producing ultrapure water from which fine particles have been highly removed and supplying the ultrapure water to a point of use is equipped with at least an ultrafiltration membrane device, and includes: a first organic porous ion exchanger provided at a position downstream of the ultrafiltration membrane device in an ultrapure water supply line for supplying the ultrapure water to the point of use; and a microfiltration membrane device provided, in the ultrapure water supply line, at a position downstream of the first organic porous ion exchanger.

11 Claims, 4 Drawing Sheets

(51) Int. Cl.

| | |
|---|---|
| *B01D 61/46* | (2006.01) |
| *B01D 61/58* | (2006.01) |
| *B01D 69/00* | (2006.01) |
| *C02F 1/32* | (2023.01) |
| *C02F 1/44* | (2023.01) |
| *C02F 9/00* | (2023.01) |
| *C02F 103/04* | (2006.01) |

(52) U.S. Cl.
CPC ................ *B01D 69/00* (2013.01); *C02F 1/32* (2013.01); *C02F 1/444* (2013.01); *C02F 9/00* (2013.01); *C02F 2001/422* (2013.01); *C02F 2001/425* (2013.01); *C02F 1/44* (2013.01); *C02F 2103/04* (2013.01)

(58) Field of Classification Search
CPC ........... C02F 2001/425; C02F 2103/04; B01D 61/145; B01D 61/463; B01D 61/58; B01D 69/00
USPC ........................................ 210/638, 650, 900
See application file for complete search history.

(56) References Cited

FOREIGN PATENT DOCUMENTS

| | | | |
|---|---|---|---|
| JP | 2016-97389 A | 5/2016 | |
| JP | 2016197048 A * | 11/2016 | |
| JP | 2019-195763 A | 11/2019 | |
| KR | 10-2020-0116516 | 10/2020 | |
| TW | 201520175 A | 6/2015 | |
| TW | 201532660 A | 9/2015 | |
| TW | 201946878 A | 12/2019 | |
| WO | 2014/178289 A1 | 11/2014 | |
| WO | WO-2019221187 A1 * | 11/2019 | .............. B01J 47/04 |
| WO | 2020241476 A1 | 12/2020 | |

OTHER PUBLICATIONS

Machine-generated English translation of WO 2019221187, generated on Dec. 4, 2025.*

Machine-generated English translation of CN110248899, generated on Dec. 4, 2025.*

Machine-generated English translation of TW 201520175, generated on Dec. 4, 2025.*

Office Action, dated Jun. 6, 2025, in Chinese family member application No. 202280026068.X, with English language translation thereof.

Office Action, dated Jun. 20, 2025, in Taiwanese family member application No. 111111253, with English translation thereof.

International Search Report issued Apr. 26, 2022 in International Bureau of WIPO Patent Application No. PCT/JP2022/004467 with an English translation thereof.

Written Opinion issued Apr. 26, 2022 in International Bureau of WIPO Patent Application No. PCT/JP2022/004467 with an English translation thereof.

* cited by examiner

[FIG. 1]
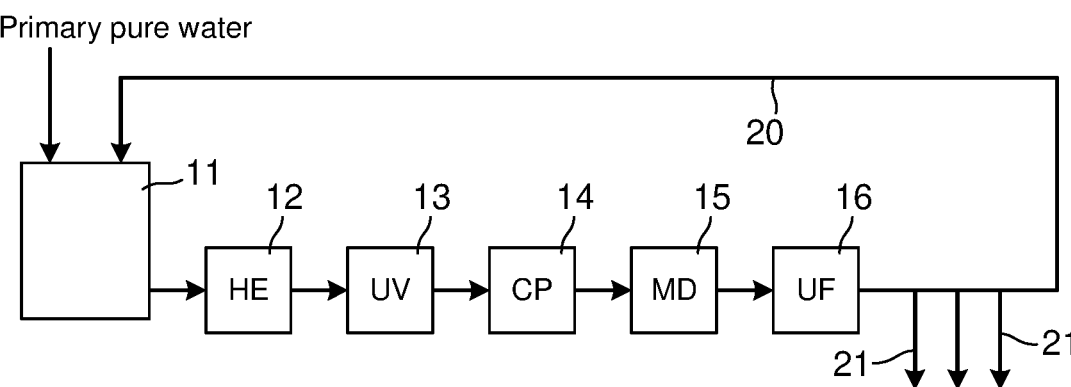
[FIG. 2]
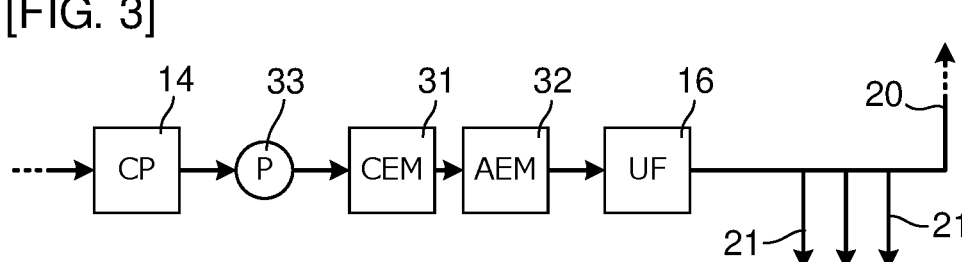
[FIG. 3]
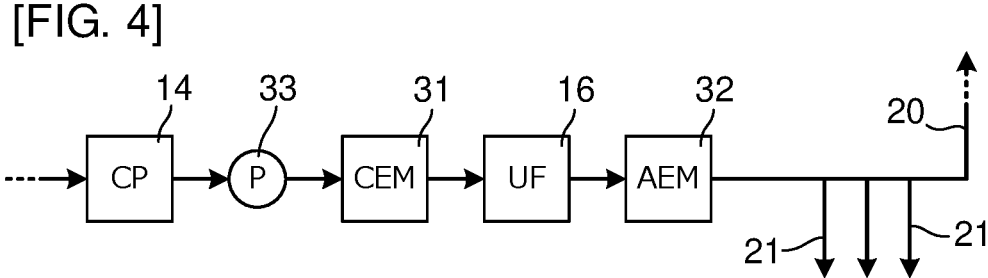
[FIG. 4]

[FIG. 5]
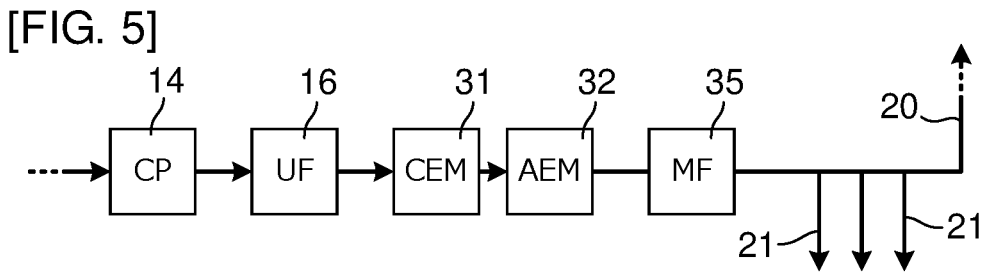
[FIG. 6]
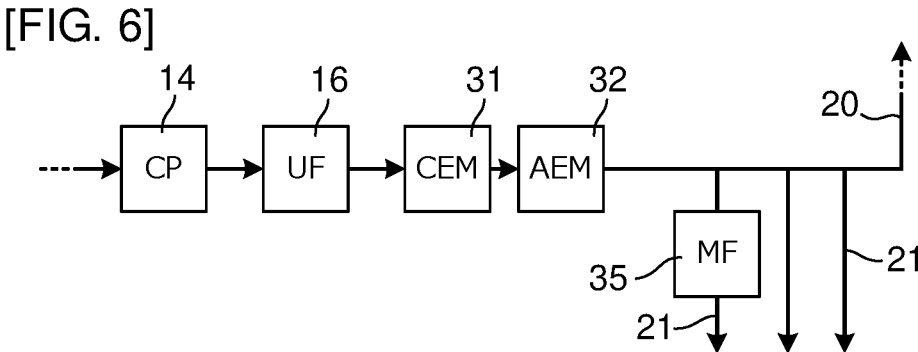
[FIG. 7]
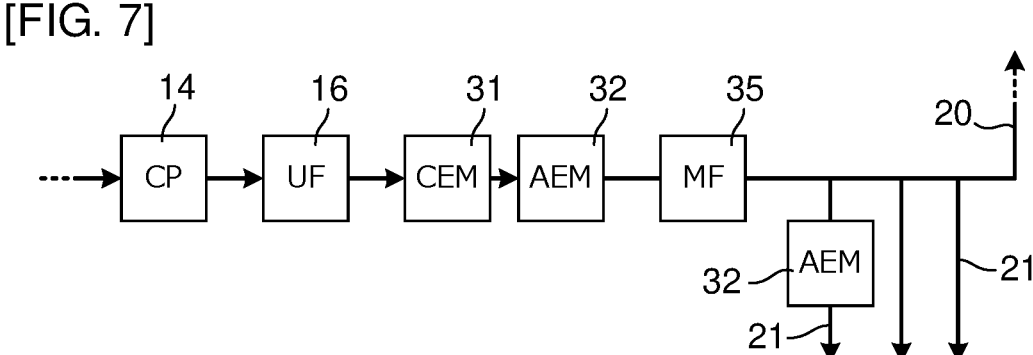
[FIG. 8]
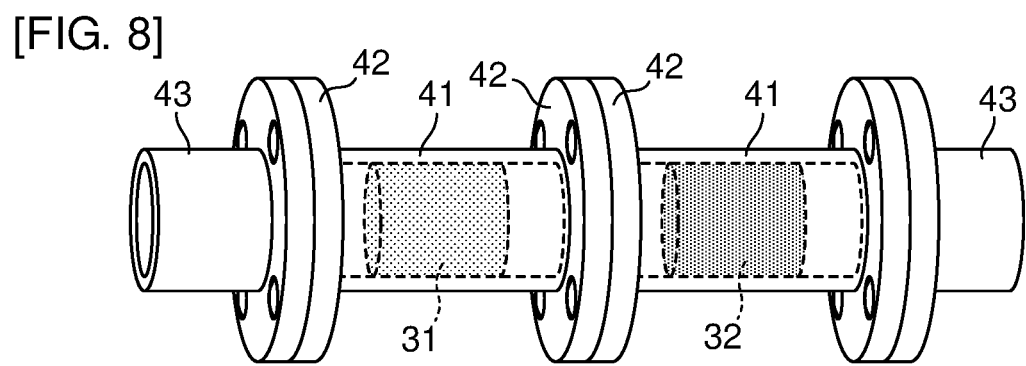

[FIG. 9]
[FIG. 10]
[FIG. 11]
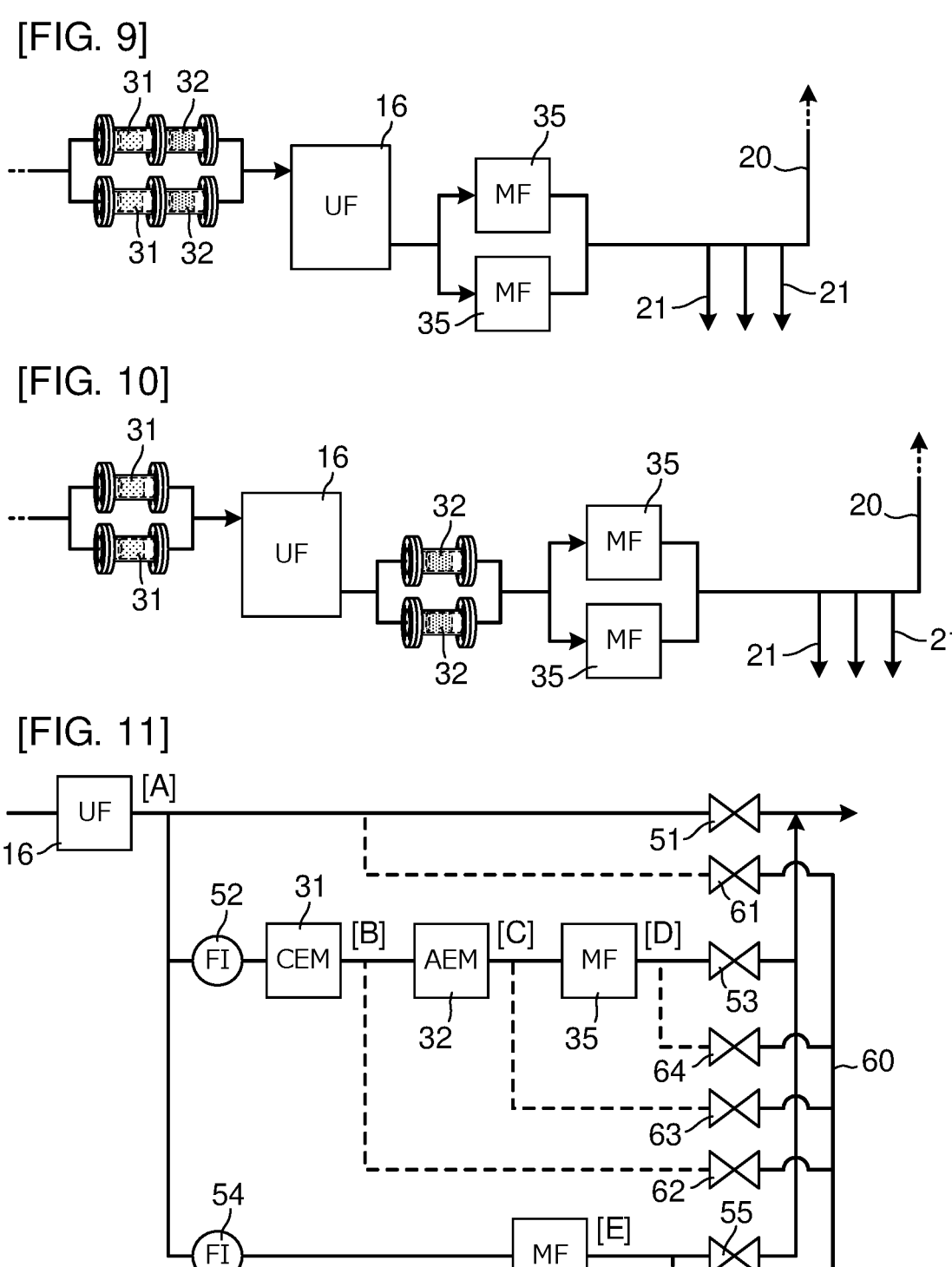

[FIG. 12A]
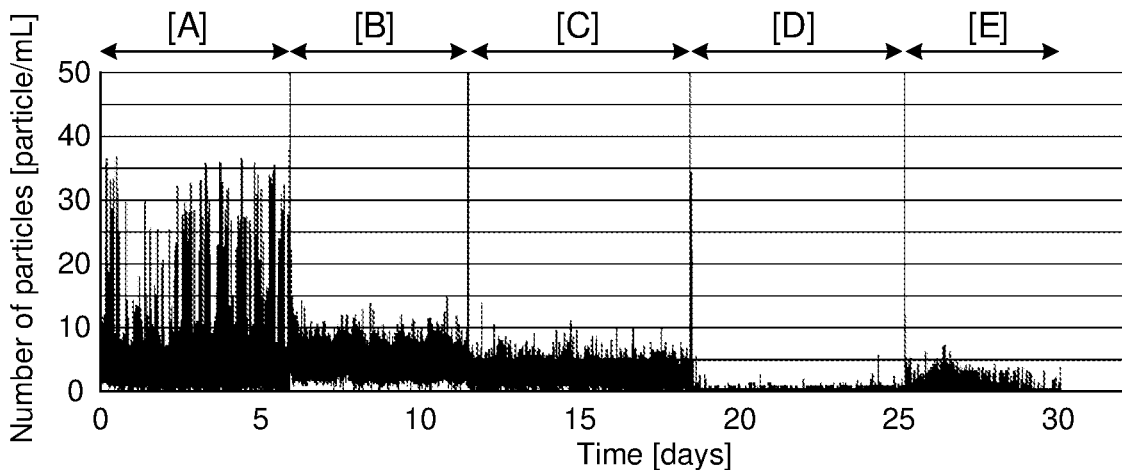
[FIG. 12B]
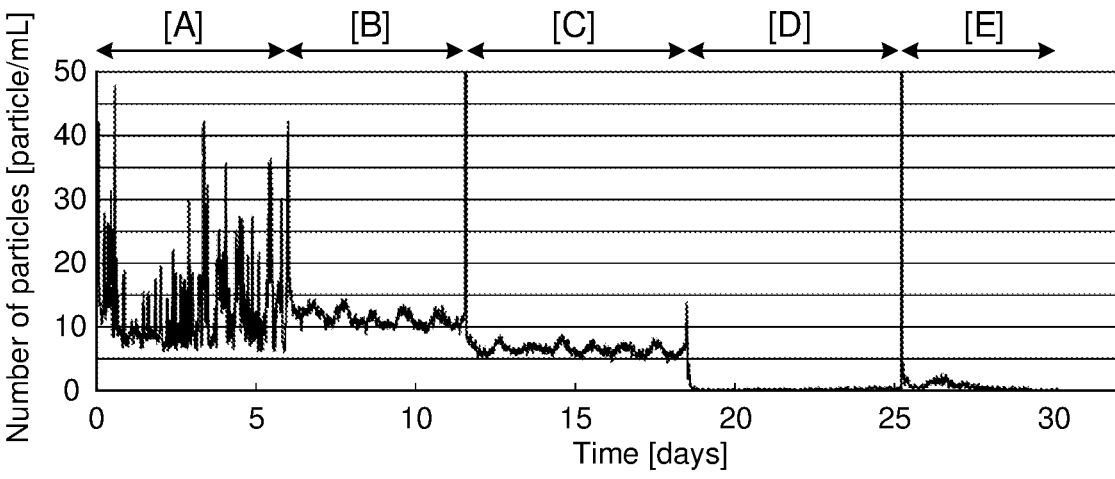

ULTRAPURE WATER PRODUCTION SYSTEM

TECHNICAL FIELD

The present invention relates to an ultrapure water production system that can produce ultrapure water of particularly high purity and supply such ultrapure water to a POU (point of use).

BACKGROUND ART

In the manufacturing processes of semiconductor devices and liquid crystal devices, ultrapure water is used for various purposes such as cleaning. In the general production method for ultrapure water, raw water, such as river water, groundwater or industrial water, is first pretreated by a pretreatment system and then fed to a primary pure water system to obtain pure water (also called primary pure water). The primary pure water is then fed to a secondary pure water system (also called a subsystem) to further purify it to obtain ultrapure water, and the ultrapure water obtained in the secondary pure water system is fed to the point of use. When ultrapure water is supplied to a facility utilizing ultrapure water, such as a manufacturing facility of semiconductor devices, the location where ultrapure water is received at the facility utilizing ultrapure water is also called a point of entry (POE). In the following description, when referring to the point of use for ultrapure water, the point of entry (POE) of ultrapure water shall also be included.

The secondary pure water system is configured so that ultrapure water not directed to a point of use is returned to the inlet side of the secondary pure water system. In other words, ultrapure water is always circulated in the secondary pure water system, and the ultrapure water undergoes further purification treatment by the circulation. As a specific configuration of the secondary pure water system, there is one in which, for example, an ultraviolet oxidation device (UV), a non-regenerative ion exchange device (CP; cartridge polisher), a membrane degassing device (MD), and an ultrafiltration membrane device (UF) are connected in this order to the outlet of a tank that receives primary pure water. A circulation pipe is provided from the outlet side of the ultrafiltration membrane device to return ultrapure water to the tank, and a supply pipe is branched off from the circulation pipe to supply ultrapure water to the point of use. In the following description, an ultrapure water production system refers to a system equipped with a secondary pure water system in which ultrapure water not supplied to the point of use is constantly circulated, the secondary pure water system including at least an ultrafiltration membrane device, wherein a supply pipe for supplying ultrapure water to the point of use branches off at a location downstream of the ultrafiltration membrane device.

When ultrapure water is used in the manufacturing process of semiconductor devices and liquid crystal devices, fine particles contained in the ultrapure water are directly responsible for reducing the manufacturing yield of the products. Therefore, it is necessary to manage the size or particle diameter of those particles and the number or concentration of the particles in a unit volume of the ultrapure water. The placement of the ultrafiltration membrane device at or near the final stage in the secondary pure water system, as described above, is also to reduce the amount of particles in the ultrapure water. However, in recent years, quality requirements for ultrapure water have become increasingly stringent, and it has become necessary to further improve the purity of ultrapure water obtained by secondary pure water systems. For example, the need has arisen to remove eluted components from the ultrafiltration membrane device itself. In addition, as semiconductor device manufacturing facilities become larger, ultrapure water production systems have also become larger, which has created the need to supply ultrapure water at a large flow rate to remote locations. In some cases, booster pumps or pressure-rising pumps are installed inside the secondary pure water system or in the piping from the secondary pure water system to the semiconductor device manufacturing facility. If a booster pump or the like is installed, it is necessary to remove particles generated by the pump from the ultrapure water.

In an attempt to further purify ultrapure water, Patent Literature 1 discloses that when raw water used for ultrapure water production contains metallic impurities of one or more of the following elements: boron, arsenic, aluminum, titanium, chromium, iron, copper, zinc, tin, vanadium, gallium, and lead, an ion exchanger-filled module in which at least a monolithic organic porous anion exchanger is filled is arranged in a processing path in the secondary pure water system or in a transfer path from the secondary pure water system to a point of use of ultrapure water.

CITATION LIST

Patent Literature

Patent Literature 1: WO 2019/221187 A1

SUMMARY OF INVENTION

Technical Problem

The technique described in Patent Literature 1 is intended to remove specific metallic impurities from raw water. Patent Literature 1 does not describe highly removing of fine particles. Desired is a technique for producing and supplying ultrapure water from which particles have been highly removed, including particles eluted from an ultrafiltration membrane or a booster pump.

It is an object of the present invention to provide an ultrapure water production system that can produce ultrapure water from which fine particles have been highly removed and supply the ultrapure water to a point of use.

According to one aspect of the present invention, an ultrapure water production system includes: a first organic porous ion exchanger provided, in an ultrapure water supply line that is connected to a point of use and that supplies the point of use with ultrapure water, at a position downstream of an ultrafiltration membrane device; and a microfiltration membrane device provided, in the ultrapure water supply line, at a position downstream of the first organic porous ion exchanger.

In another aspect, an ultrapure water production system according to the present invention includes: a first organic porous ion exchanger provided at a position between an ultrafiltration membrane device and a pump which is provided at a position upstream of the ultrafiltration membrane device in an ultrapure water supply line that is connected to a point of use and that supplies the point of use with ultrapure water; and a microfiltration membrane device provided, in the ultrapure water supply line, at a position downstream of the ultrafiltration membrane device.

Advantageous Effect of Invention

According to the present invention, it is possible to obtain an ultrapure water production system which can produce ultrapure water from which fine particles are highly removed and supply the ultrapure water to a point of use.

BRIEF DESCRIPTION OF DRAWINGS

FIG. 1 is a flow sheet explaining an ultrapure water production system;

FIG. 2 is a view illustrating the configuration of an example of the ultrapure water production system;

FIG. 3 is a view illustrating the configuration of another example of the ultrapure water production system;

FIG. 4 is a view illustrating the configuration of another example of the ultrapure water production system;

FIG. 5 is a view illustrating the configuration of the ultrapure water production system according to an embodiment of the present invention;

FIG. 6 is a view illustrating the configuration of another example of the ultrapure water production system;

FIG. 7 is a view illustrating the configuration of another example of the ultrapure water production system;

FIG. 8 is a view illustrating an installation example of an organic porous ion exchanger;

FIG. 9 is a view illustrating the configuration of another example of the ultrapure water production system;

FIG. 10 is a view illustrating the configuration of another example of the ultrapure water production system;

FIG. 11 is a view illustrating the configuration of an apparatus used in Example 1;

FIG. 12A is a graph illustrating the results of Example 1; and

FIG. 12B is a graph illustrating the results of Example 1.

DESCRIPTION OF EMBODIMENTS

Next, embodiments of the present invention will be explained with reference to the drawings. Before describing the ultrapure water production system according to the present invention, a typical ultrapure water production system which produces ultrapure water from primary pure water is explained. The ultrapure water production system shown in FIG. 1 is configured as a general secondary pure water system (subsystem) used in the production of ultrapure water, and equipped with: tank 11 that stores primary pure water supplied from a primary pure water system (not shown); heat exchanger (HE) 12; ultraviolet oxidation device (UV) 13; non-regenerative ion exchange device (CP) 14; membrane degassing device (MD) 15; and ultrafiltration membrane device (UF) 16. Heat exchanger 12, ultraviolet oxidation device 13, non-regenerative ion exchange device 14, membrane degassing device 15, and ultrafiltration membrane device 16 are connected to the outlet of tank 11 in this order. Non-regenerative ion exchange device 14 is filled with a bead-shaped or granular ion exchange resin. Membrane degassing device 15 may not be provided. Provided at the outlet of ultrafiltration membrane device 16 is, circulation pipe 20 for returning ultrapure water that has passed through ultrafiltration membrane device 16 to tank 11. Supply pipe 21 branches off from circulation pipe 20 to supply ultrapure water to the point of use of ultrapure water or the point of entry of a facility utilizing ultrapure water. Therefore, supply pipe 21 branches off from downstream of ultrafiltration membrane device 16. Supply pipe 21 is also called distribution. In the illustrated example, a plurality of supply pipes 21 branch off from circulation pipe 20. In this ultrapure water production system, ultrapure water that is not supplied to the point of use is always circulated to tank 11, which is upstream of ultrafiltration membrane system 16.

The ultrapure water production system according to the present invention is configured by adding an ion exchanger composed of organic porous material, i.e., an organic porous ion exchanger, to the typical ultrapure water production system as shown in FIG. 1, and installing a microfiltration membrane device downstream of at least one of the organic porous ion exchangers so as to obtain ultrapure water from which particles including the particles generated in the ultrafiltration membrane device and the booster pumps are highly removed. Although a typical ion exchange resin is bead-shaped or granular with a diameter of a several millimeters or less, the organic porous ion exchangers have a skeleton composed of an organic polymer to form a continuous macropore structure in which a bubble-shaped macropore is continuously formed, as described in Patent Literature 1, and an ion exchange group is introduced into the organic polymer serving as the skeleton. The organic porous ion exchangers are also called monolithic organic porous ion exchangers or monolithic ion exchangers. Particularly, the organic porous ion exchanger that is a cation exchanger is called a cation exchange monolith (CEM), and the organic porous ion exchanger that is an anion exchanger is called an anion exchange monolith (AEM). The organic porous ion exchangers can be molded into any shape and size. Since it has a continuous macroporous structure, the organic porous ion exchanger is formed into an elastic sponge-like structure, through which water to be treated can pass, and ion exchange for the water to be treated occurs during the passage of the water. An example of a method for producing an organic porous ion exchanger, i.e., a monolithic organic porous ion exchanger, is described in Patent Literature 1.

Before describing the ultrapure water production system according to the present invention, an ultrapure water production system configured by adding an organic porous ion exchanger will be explained. FIG. 2 is a view illustrating the essential parts of such an ultrapure water production system. The ultrapure water production system shown here is configured such that, in the ultrapure water production system shown in FIG. 1, cation exchange monolith (CEM) 31 and anion exchange monolith (AEM) 32 are arranged in this order with respect to the outlet of ultrafiltration membrane device 16. FIG. 2 illustrates the position and their vicinity where cation exchange monolith 31 and anion exchange monolith 32 are placed in the ultrapure water production system. In FIGS. 2 to 7, membrane degassing device 15, which is arranged between the outlet of non-regenerative ion exchange device 14 and the inlet of ultrafiltration membrane device 16 in the ultrapure water production system, is not depicted. The position where supply pipe 21 branches off from circulation pipe 20 is downstream of anion exchange monolith 32, which is an ion exchanger on the downstream side. By arranging cation exchange monolith 31 and anion exchange monolith 32 in this manner, it is possible to remove particles generated in ultrafiltration membrane device 16, such as those generated from adhesives used in the joint portions in ultrafiltration membrane device 16. When a bead-shaped or granular ion exchange resin is used instead of the monolithic ion exchanger, a metal mesh or the like must be used to prevent the ion exchange resin from leaking out, and there is a risk of generation of fine particles from the mesh. However, when a monolithic ion exchanger is used, no mesh is required and there is no risk of generation of particles from the mesh. In addition, since the monolithic ion exchanger has a higher adsorption rate of ionic impurities and particles than a bead-shaped or granular ion exchange resin, it is possible to reduce the effective volume thereof and thus reduce the size of the facility.

In the ultrapure water production system shown in FIG. 2, the order of arrangement of monolithic cation exchanger 31 and anion exchange monolith 32 may be replaced, only one of the monolithic ion exchangers may be installed, or at least one of cation exchange monolith 31 and anion exchange monolith 32 may be installed in multiple. However, in order to efficiently remove fine particles or the like generated in ultrafiltration membrane device 16, it is desirable to arrange cation exchange monolith 31 upstream and anion exchange monolith 32 downstream. The monolithic ion exchanger, i.e., organic porous ion exchanger, is thought to be able to remove particles through electrostatic effects. In particular, anion exchange monolith 32 has excellent particle removal performance. In addition, since microscopic pores are formed on the surface of the monolithic ion exchanger, there is the possibility that particles are removed by being trapped in the pores. The positions where cation exchange monolith 31 and anion exchange monolith 32 are arranged may be either in circulation pipe 20 or in supply pipe 21. In other words, the monolithic ion exchanger may be installed in the path of ultrapure water from the outlet of ultrafiltration membrane device 16 to the point of use of ultrapure water. For example, in the configuration shown in FIG. 2, the installation position of anion exchange monolith 32 may be in supply pipe 21 instead of circulation pipe 20. If a booster pump for pressure rising is provided in the ultrapure water production system including circulation pipe 20 or in supply pipe 21, the installation position of monolithic ion exchanger is preferably at a latter stage of the booster pump. In the following description, the line connecting the outlet of non-regenerative ion exchange device 14 to the point of use point via supply pipe 21 and supplying ultrapure water to the point of use is called ultrapure water supply line.

FIG. 3 illustrates another example of the ultrapure water production system. The ultrapure water production system shown here differs from the one shown in FIG. 2 in that cation exchange monolith 31 and anion exchange monolith 32 are arranged on the inlet side of ultrafiltration membrane device 16. This configuration is suitable when booster pump (P) 33 is provided at the front stage of ultrafiltration membrane device 16. In the illustrated example, cation exchange monolith 31 and anion exchange monolith 32 are connected in this order to the outlet of booster pump 33, and water that has passed through anion exchange monolith 32 is supplied to ultrafiltration membrane device 16. In this ultrapure water production system, ultrapure water circulating through circulation pipe 20 is returned upstream of booster pump 33. Impurities such as metallic components and particles are generated in booster pump 33, which become a load on ultrafiltration membrane device 16, but, by arranging cation exchange monolith 31 and anion exchange monolith 32 between booster pump 33 and ultrafiltration membrane device 16, inflow of the impurities into ultrafiltration membrane device 16 can be lowered and the load on ultrafiltration membrane device 16 can be reduced. In addition, the monolithic ion exchanger has a smaller pressure drop during water flow than those filled with a bead-shaped or granular ion exchange resin, and is thus advantageous when increasing the supply pressure of ultrapure water with booster pump 35.

Also in the ultrapure water production system shown in FIG. 3, the order of arrangement of cation exchange monolith 31 and anion exchange monolith 32 may be replaced, or only one of the monolithic ion exchangers may be installed. However, in order to efficiently remove particles or the like generated by booster pump 33 or the like, it is desirable to arrange cation exchange monolith 31 upstream and anion exchange monolith 32 downstream.

FIG. 4 illustrates another example of the ultrapure water production system. The ultrapure water production system shown here differs from that shown in FIG. 3 in that cation exchange monolith 31 is arranged at the inlet side of ultrafiltration membrane device 16 while anion exchange monolith 32 is arranged at the outlet side of ultrafiltration membrane device 16. At the downstream of anion exchange monolith 32, supply pipe 21 branches off from circulation pipe 20. This configuration is suitable when booster pump 33 is provided at the front stage of ultrafiltration membrane device 16, in which case cation exchange monolith 31 is placed between booster pump 33 and ultrafiltration membrane device 16. In this ultrapure water production system, ultrapure water circulating through circulation pipe 20 is returned upstream of booster pump 33. Cation exchange monolith 31 arranged in the front stage of ultrafiltration membrane device 16 mainly removes metallic impurities generated by booster pump 33, and anion exchange monolith 32 arranged in the subsequent stage of ultrafiltration membrane device 16 mainly removes particles generated by booster pump 33 and ultrafiltration membrane device 16. The system shown in FIG. 4 is also advantageous when increasing the supply pressure of ultrapure water because the pressure drop during water flow through the monolithic ion exchanger is small. In the ultrapure water production system shown in FIG. 4, anion exchange monolith 32 only needs to be provided at one of the locations in the ultrapure water path from the outlet of ultrafiltration membrane device 16 to the point of use of ultrapure water. In the ultrapure water production system shown in FIG. 4, the installation positions of cation exchange monolith 31 and anion exchange monolith 32 can be reversed so that anion exchange monolith 32 is provided on the inlet side of ultrafiltration membrane device 16 and cation exchange monolith 31 is provided on the outlet side of ultrafiltration membrane device 16. However, from a view point of removing particles, it is preferable to allow water to flow through cation exchange monolith 31, ultrafiltration membrane device 16, and anion exchange monolith 32 in this order.

The ultrapure water production system according to the present invention is configured such that, in the ultrapure water production systems shown in FIGS. 2 to 4, a microfiltration membrane device is installed downstream of at least one monolithic ion exchanger, i.e., organic porous ion exchanger, to remove fine particles that could not be removed by the monolithic ion exchanger, thereby further improving removal performance for particles. The ultrapure water production system according to the present invention shown in FIG. 5 is configured such that, in the ultrapure water production system shown in FIG. 2, microfiltration membrane device 35 is arranged at the outlet of anion exchange monolith 32, and the supply pipe 21 branches off from circulation pipe 20 at the downstream of microfiltration membrane device 35. The ultrapure water production system shown in FIG. 6 is configured such that, in the ultrapure water production system shown in FIG. 2, microfiltration membrane device 35 is arranged in supply pipe 21. In microfiltration membrane system 35 used in the examples shown here, the pore size in its microfiltration membrane is, for example, 1 nm or larger. In the ultrapure water production system according to the present invention, it is preferable that at least one microfiltration membrane device 35 is provided at a position which is downstream of all monolithic ion exchanger and in the path of ultrapure water from the outlet of ultrafiltration membrane device 16 to the point of use of ultrapure water. Described here are an example (FIG. 5) of installing microfiltration membrane device 35 in circulation pipe 20 in the ultrapure water production system shown in FIG. 2, and another example (FIG. 6) of installing in supply pipe 21. Similarly, in the ultrapure water production systems shown in FIGS. 3 and 4, microfiltration membrane device 35 can be installed in circulation pipe 20 or supply pipe 21. When a booster pump for boosting pressure is provided in the ultrapure water production systems shown in FIGS. 5 and 6, it is preferable to arrange the booster pump between the outlet of non-regenerative ion exchange device 14 and the inlet of ultrafiltration membrane device 16.

In the ultrapure water production systems shown in FIGS. 2 to 6, when, for example, the length of supply pipe 21 is longer, another monolithic ion exchanger may be placed in supply pipe 21 in addition to the monolithic ion exchanger in the secondary pure water system side, including circulation pipe 20, to remove particles generated from each piping or the like. Since the monolithic ion exchanger placed in supply pipe 21 focuses on the removal of particles rather than metallic impurities, it is preferable that the monolithic ion exchanger is an anion exchange monolith rather than a cation exchange monolith when considering the electrostatic interaction with the particles. The ultrapure water production system shown in FIG. 7 is configured such that, in the ultrapure water production system shown in FIG. 5, anion exchange monolith 32 is arranged in supply pipe 21. By providing anion exchange monolith 32 in supply pipe 21, the amount of particles in the ultrapure water supplied to the point of use connected to that supply pipe 21 can be further reduced.

Next, the installation method of the monolithic ion exchanger, i.e., organic porous ion exchanger, in an ultrapure water production system will be explained. In Patent Literature 1, it is disclosed that monolithic ion exchangers are filled into cartridges. A cartridge filled with a monolithic ion exchanger is accommodated inside a housing (called a cartridge housing, filter housing, housing column, etc.) connected to the piping. However, the monolithic ion exchanger can be elastic and sponge-like, in which case the monolithic ion exchanger can be placed directly in the pipe by inserting it into the pipe. When the monolithic ion exchanger is placed directly in the pipe, there is no need for a cartridge to be filled with the monolithic ion exchanger or a housing to accommodate the cartridge, so that there is no fear of generation of impurities and particles from them, and ultrapure water having better water quality can be obtained.

When the monolithic ion exchanger is placed directly in the piping, the material of the piping in which the monolithic ion exchanger is placed is not particularly limited, and piping generally used for ultrapure water may be used. Metallic or non-metallic piping can be used. Non-metallic piping is preferred in terms of less elution of metallic components. Non-metallic piping includes polypropylene (PP) tubes, polyvinyl chloride (PVC) tubes, chlorinated polyvinyl chloride (CPVC) tubes, high-density polyethylene (HDPE) tubes, low-density polyethylene (LDPE) tubes, polyvinylidene fluoride (PVDF) tubes, perfluoroalkoxyalkane (PFA) tubes, polytetrafluoroethylene (PTFE) tubes, and the like. In particular, it is preferable to use piping made of a fluororesin, which has low elution of metal components and high chemical resistance. The use of polyvinylidene fluoride (PVDF) tubes is particularly preferred because of their excellent pressure resistance.

Although methods of attaching the piping in which the monolithic ion exchanger is placed to an ultrapure water supply line include welding, bonding, flange-tightening and the like, it is preferable to use a flange-tightening method in terms of ease of maintenance. In addition, the material of the O-ring or gasket used in pipe connection is not particularly limited, but it is preferable to use an O-ring made of a fluororesin or a fluoro-rubber in terms of low elution of metal components. For performing the maintenance, two or more pipes in which the monolithic ion exchanger is arranged are preferably provided in parallel, as shown in FIGS. 9 and 10 described below.

The diameter of the pipe used to place the monolithic ion exchanger inside is preferably set according to the water flow rate to the monolithic ion exchanger, and is generally preferably in the range of 15 A to 200 A with nominal diameter defined by JIS (Japan Industry Standards). If the pipe diameter is smaller than 15 A, when pipes with monolithic ion exchangers are installed in parallel, the number of pipes installed in parallel to obtain the required water flow rate becomes excessively large, resulting in high installation costs.

FIG. 8 shows an example of arranging a monolithic ion exchanger in a pipe. In FIG. 8, straight piping member 41 has flanges 42 at both ends for connection to other pipes 43 (or other piping members 41) that have flanges. Cation exchange monolith 31 is inserted inside piping member 41 on the left side in the figure. In the un-pressed state, cation exchange monolith 31 is processed into a cylindrical shape with dimensions slightly larger than the inner diameter of piping member 41, and is placed inside piping member 41 in a state of pressing against the inner wall of piping member 41 by pushing it into piping member 41 from one end of piping member 41. Since cation exchange monolith 41 presses against the inner wall of piping member 41 in the direction of expansion, moving of cation exchange monolith 41 by the water flow is prevented. To ensure that cation exchange monolith 41 is not moved by the water flow, a step may be provided on the inner wall of piping member 41 and cation exchange monolith 41 may be engaged in the step. Similarly, anion exchange monolith 42 is inserted into piping member 41 on the right side of the figure. When replacing the monolithic ion exchanger, piping member 41 in which the monolithic ion exchanger is inserted may be removed from other pipes 43, and then piping member 41 in which the new monolithic ion exchanger is inserted may be attached to the other pipes 43 using flanges 42. If the monolithic ion exchanger is not necessary in the example shown in FIG. 8, pipes 43 on both sides can be connected by a flanged pipe without a monolithic ion exchanger. In the example shown in FIG. 8, one monolithic ion exchanger is arranged for one piping member 41, but multiple monolithic ion exchangers can be arranged for one piping member 41. In such a case, for one piping member 41, multiple cation exchange monoliths 31 may be arranged, multiple anion exchange monoliths 32 may be arranged, or a combination of cation exchange monolith 31 and anion exchange monolith 32 may be arranged.

The monolithic ion exchanger can reduce the pressure drop during water flow as compared to those filled with a bead-shaped or granular ion exchange resin, but it may be desirable to further reduce the water flow differential pressure in the monolithic ion exchanger, such as when the supply pressure of ultrapure water is desired to be increased. To reduce the water flow differential pressure in the monolithic ion exchanger, the path of water to flow through the monolithic ion exchanger can be branched into multiple pipes installed in parallel, and a monolithic ion exchanger can be installed for each branched pipe. Similarly, to reduce the water flow differential pressure in microfiltration membrane device 35, the path of water to flow through micro-filtration membrane device 35 can be branched into multiple pipes installed in parallel, and microfiltration membrane device 35 can be installed for each branched pipe. FIG. 9 shows the ultrapure water production system shown in FIG. 3 with microfiltration membrane device 35 provided at the outlet of ultrafiltration membrane device 16. In this ultrapure water production system, two sets of assembly are provided in parallel each of which is configured to connect cation exchange monolith 31 and anion exchange monolith 32 in series by piping, and water to be supplied to ultrafiltration membrane device 16 is diverted to these sets. Water from both anion exchange monoliths 32 merges and is supplied to ultrafiltration membrane device 16. Two microfiltration membrane devices 35 are also installed in parallel, and the water that has passed through ultrafiltration membrane device 16 is distributed to two microfiltration membrane devices 35, and the water that has passed through these microfiltration membrane devices 35 is merged and then fed into the supply pipe 21. Although not shown in FIG. 9, a pump such as a booster pump is provided upstream of cation exchange monolith 31.

FIG. 10 shows the ultrapure water production system shown in FIG. 4 with microfiltration membrane device 35 provided downstream of anion exchange monolith 32. On the upstream of ultrafiltration membrane device 16, the piping is branched into two parallel pipes, each of which has cation exchange monolith 31, the water from the upstream is divided, and the water passing through these two cation exchange monoliths 31 merges and is fed to ultrafiltration membrane device 16. The pipe at the outlet of ultrafiltration membrane device 16 is also branched into two pipes, and anion exchange monolith 32 is installed in each of the branched pipes. The water that has passed through anion exchange monoliths 32 is once merged and then diverted back into the two pipes. Each of these two pipes is equipped with microfiltration membrane device 35. The water that has passed through two microfiltration membrane devices 35 is merged, and then some of them is fed into supply pipe 21 and the rest is returned upstream of cation exchange mono-lith 31 through circulation pipe 20. Although not shown in the system illustrated in FIG. 10, a pump such as a booster pump is provided upstream of cation exchange monolith 31. In the system shown in FIG. 10, the outlet water from two anion exchange monoliths 32 installed in parallel is once merged and then distributed to two microfiltration mem-brane units 35, but the outlet water from respective anion exchange monoliths 32 may be fed directly to microfiltration membrane devices 35 at the subsequent stage without merg-ing. In that case, two sets of connections are prepared, in each of which one microfiltration membrane device 35 connected to the outlet of one anion exchange monolith 32, and the two sets of connections are arranged in parallel.

In each of the ultrapure water production systems described above, the conditions for water flow to the mono-lithic ion exchanger are not particularly restricted, but the water flow rate expressed in terms of space velocity (SV) is preferably less than 20000 h$^{-1}$, more preferably from 10 to 4000 h$^{-1}$ and especially preferably from 600 to 4000 h$^{-1}$. The water flow rate expressed in terms of linear velocity (LV) is preferably less than 1000 m/h, and more preferably less than 500 m/h.

EXAMPLES

The present invention will be described in more detail in accordance with Examples.

Example 1

An apparatus shown in FIG. 11 was assembled. The apparatus shown in FIG. 11 is equipped with ultrafiltration membrane device 16, and configured such that the outlet water from ultrafiltration membrane device 16 is distributed into three pathways: a first pathway where the outlet water is discharged directly through valve 51; a second pathway where the outlet water is discharged after passing through flowmeter (FI) 52, cation exchange monolith 31, anion exchange monolith 32, microfiltration membrane device 35 and valve 53 in this order; and a third pathway where the outlet water is discharged after passing through flowmeter 54, microfiltration membrane device 36, and valve 55 in that order. Apart from these pathways, measurement pipe 60 to which particle counter (PC) 66 is connected is provided. As particle counter 66, UltraChem 40 from Spectris was used. In order to perform switching among the outlet water [A] from ultrafiltration membrane device 16, the outlet water [B] from cation exchange monolith 31, the outlet water [C] from anion exchange monolith 32, the outlet water [D] from microfiltration membrane device 35 provided in the second pathway, and the outlet water [E] from microfiltration mem-brane device 36 provided in the third pathway to supply the respective outlet water to measurement pipe 60, valves 61 to 65 are arranged in the respective pipes for supplying the outlet water [A] to [E] to measurement pipe 61. A cation exchange monolith and an anion exchange monolith manu-factured according to the method described in paragraphs to of Patent Literature 1 (Reference Example 1 in Patent Literature 1) were used as cation exchange monolith 31 and anion exchange monolith 32. Both the cation exchange monolith and anion exchange monolith were used by fab-ricating ion exchanger-filled cartridges where the monolithic ion having a length of 50 mm is filled into a 150A PPG flanged pipe and attaching the cartridges to the piping. A microfiltration membrane device with a pore size of 20 nm was used as microfiltration membrane devices 35, 36.

Ultrapure water was supplied to ultrafiltration membrane device 16, and the outlet water [A] from ultrafiltration membrane device 16 at that time was distributed to the first and third pathways at 30 L/min each and kept flowing. The space velocity (SV) of water passing through each of cation exchange monolith 31 and anion exchange monolith 32 was 4000 h$^{-1}$ and the linear velocity (LV) was 400 m/h. Then, by operating valves 61 to 65, the outlet water [A] from ultra-filtration membrane device 16, the outlet water [B] from cation exchange monolith 31, the outlet water [C] from anion exchange monolith 32, the outlet water [D] from microfiltration membrane device 35 provided in the second pathway, and the outlet water [E] from microfiltration mem-brane device 36 provided in the third pathway were succes-sively fed to measurement piping 60 in this order, and the number of particles with a diameter of 40 nm or larger contained in the outlet water [A] to [E] was continuously measured by particle counter 66. In the following descrip-tion, the number of particles refers to the number of particles in a unit volume of outlet water. The results of the counting the number of particles are shown in FIG. 12A. A 60-minute moving average of the results shown in FIG. 12A is also shown in FIG. 12B. As shown in FIGS. 12A and 12B, for the first approximately six days from the start of the measure-ment, the number of particles in the outlet water [A] of ultrafiltration membrane system 16 was obtained, and spike-like jumps in the number of particles occurred frequently. For the next approximately five days, the number of particles in the outlet water [B] of cation exchange monolith 31, i.e., the water that passed through ultrafiltration membrane device 16 and cation exchange monolith 31 in that order, was determined. In the outlet water [B], the results were similar to the averaged number of particles in the outlet water [A]. For the next approximately seven days, the number of particles in the outlet water [C] of anion exchange monolith 32, i.e., the water that passed through ultrafiltration membrane device 16, cation exchange monolith 31, and anion exchange monolith 32 in that order, was determined. The number of particles at this time was clearly lower than the number of particles in the outlet water [B]. For the next approximately six days, the number of particles in the outlet water [D] of microfiltration membrane system 35 in the second pathway, i.e., water that passed through ultrafiltration membrane system 16, cation exchange monolith 31, anion exchange monolith 32, and microfiltration membrane system 35 in that order, was determined. The outlet water [D] contains few particles. For the last approximately five days, the number of particles in the outlet water [E] of microfiltration membrane system 36 provided in the third pathway, i.e., the water that passed through ultrafiltration membrane device 16 and microfiltration membrane system 36 in that order without the organic porous ion exchanger, i.e., monolithic ion exchanger, was determined. The number of particles in the outlet water [E] is also lower than that in the outlet water of each monolithic ion exchanger, but slightly higher than that in the outlet water [D] of microfiltration membrane device 35 provided in the second pathway.

From the above results, it was found that the number of particles can be reduced by sequentially passing the outlet water from ultrafiltration membrane device 16 through cation exchange monolith 31 and anion exchange monolith 32, and that, by further passing the water through microfiltration membrane device 35, the concentration of detected particles can be reduced to less than 1 particle/mL.

REFERENCE SIGNS LIST

11 Primary pure water tank;
12 Heat Exchanger (HE);
13 Ultraviolet oxidation device (UV);
14 Non-regenerative ion exchange device (CP);
15 Membrane degassing device (MD);
16 Ultrafiltration membrane device (UF);
20 Circulation pipe;
21 Supply pipe;
31 Cation exchange monolith (CEM);
32 Anion exchange monolith (AEM);
33 Booster pump (P);
34 Microfiltration membrane device (MF);
41 Piping member;
42 Flange;
43 Pipe;
66 Particle counter (PC); and
67 Total organic carbon concentration indicator (TOC).

The invention claimed is:

1. An ultrapure water production system comprising:
a first monolithic organic porous ion exchanger provided at a position downstream of an ultrafiltration membrane device, in an ultrapure water supply line that is connected to a point of use and that supplies the point of use with ultrapure water; and
a microfiltration membrane device provided, in the ultrapure water supply line, at a position downstream of the first monolithic organic porous ion exchanger, wherein the first monolithic organic porous ion exchanger is inserted into an interior of a pipe in a state of pressing against an inner wall of the pipe in a direction of expansion.

2. The ultrapure water production system according to claim 1, further comprising:
a second monolithic organic porous ion exchanger provided, in the ultrapure water supply line, at a position which is upstream of the first monolithic organic porous ion exchanger and downstream of the ultrafiltration membrane device,
wherein the first monolithic organic porous ion exchanger is an anion exchanger, and the second monolithic organic porous ion exchanger is a cation exchanger.

3. The ultrapure water production system according to claim 2, wherein the second monolithic organic porous ion exchanger is inserted into an interior of a pipe in a state of pressing against an inner wall of the pipe in a direction of expansion.

4. The ultrapure water production system according to claim 1, further comprising a third monolithic organic porous ion exchanger provided, in the ultrapure water supply line, at a position downstream of the microfiltration membrane device.

5. The ultrapure water production system according to claim 1, further comprising:
a pump provided, in the ultrapure water supply line, at a position upstream of the ultrafiltration membrane device; and
a fourth monolithic organic porous ion exchanger provided, in the ultrapure water supply line, at a position which is downstream of the pump and upstream of the ultrafiltration membrane device.

6. The ultrapure water production system according to claim 1, wherein a pore diameter of a microfiltration membrane provided in the microfiltration membrane device is 1 nm or larger.

7. The ultrapure water production system according to claim 6, wherein the second monolithic organic porous ion exchanger is inserted into an interior of a pipe in a state of pressing against an inner wall of the pipe in a direction of expansion.

8. The ultrapure water production system according to claim 1, wherein, at a position where the microfiltration membrane device is to be installed, a path of water to flow through the microfiltration membrane device is branched into a plurality of pipes provided in parallel, and the microfiltration membrane device is provided for each of branched pipes.

9. The ultrapure water production system according to claim 1, wherein, at a position where at least one monolithic organic porous ion exchanger of the first monolithic organic porous ion exchanger to a fourth monolithic organic porous ion exchanger is to be installed, a path of water to flow through the at least one monolithic organic porous ion exchanger is branched into a plurality of pipes provided in parallel, and the at least one monolithic organic porous ion exchanger is provided for each branched pipe.

10. An ultrapure water production system comprising:
a first monolithic organic porous ion exchanger provided, in an ultrapure water supply line that is connected to a point of use and that supplies the point of use with ultrapure water, at a position between an ultrafiltration membrane device and a pump which is provided at a position upstream of the ultrafiltration membrane device; and a microfiltration membrane device provided, in the ultra-pure water supply line, at a position downstream of the ultrafiltration membrane device, wherein the first monolithic organic porous ion exchanger is inserted into an interior of a pipe in a state of pressing against an inner wall of the pipe in a direction of expansion.

11. The ultrapure water production system according to claim 10, further comprising:

a second monolithic organic porous ion exchanger provided, in the ultrapure water supply line, at a position which is upstream of the ultrafiltration membrane device and downstream of the first monolithic organic porous ion exchanger, wherein the first monolithic organic porous ion exchanger is a cation exchanger, and the second monolithic organic porous ion exchanger is an anion exchanger.

\* \* \* \* \*